Patented Sept. 22, 1953

2,653,113

UNITED STATES PATENT OFFICE 2,653,113

SIZING OF ETHYLENE POLYMER STRUCTURES

Thomas Franklin Banigan, Kenmore, N. Y., assignor to E. I. du Pont de Nemours and Company, Wilmington, Del., a corporation of Delaware No Drawing. Application September 13, 1951, Serial No. 246,526

10 Claims. (Cl. 117—138.8)

This invention relates to improvements in films, sheets, filaments, fibers, monofils and like structures of solid ethylene polymer, and more particularly to improvements in the surface of ethylene polymer structures of high transparency.

Films of ethylene polymer (i. e., polyethylene) are highly useful in a great variety of packaging applications such as for fresh produce, frozen foods, dried milk, chemicals and pharmaceuticals, textiles, etc. A description of films made from ethylene polymer is embodied in U. S. P. 2,219,700, issued to Perrin et al. These films have excellent inherent moistureproofness, good mechanical strength and are highly resistant to the action of many chemicals; and, though they are described as being translucent to transparent, all ethylene polymer films heretofore commercially available have been translucent. Filaments, staple fibers, monofils and the like are described in U. S. P. 2,210,774.

Films, filaments, fibers, monofils, coatings, etc. of solid ethylene polymer, however, have a propensity to develop strong electrostatic charges which make them difficult to manipulate during manufacture and subsequent processing, such as spinning, knitting, weaving, slitting, printing, sealing, etc. By reason of their highly charged surfaces, these articles also accumulate heavy dust deposits which, of course, are very undesirable.

Further, ethylene polymer films are smooth and very flexible; and superimposed sheets of the material separate with difficulty, particularly when pressure, even though moderate, is applied. In continuous roll form, the films do not slide easily over automatic packaging machinery, resulting in very unsatisfactory operation.

Heretofore, a number of sizing compositions have been developed for improving the surface properties of solid ethylene polymer structures, cf. U. S. P. 2,519,013 to T. F. Banigan, wherein is disclosed a sizing composition comprising a water-soluble alkyl aryl polyglycol ether. These sizing compositions are highly efficient as anti-static and slip-promoting agents for solid ethylene polymer structures such as the translucent film heretofore available. However, techniques have recently been developed for producing commercially a transparent solid ethylene polymer film; and it has been found that the sizing compositions which have previously been satisfactorily used for sizing translucent film are unsuitable for sizing transparent film, for the reason that in every instance the sizing composition does not improve both the slip and anti-static properties.

An object of this invention, therefore, is to improve the surface characteristics of films, filaments, fibers, monofils, sheets, coatings, etc. of solid ethylene polymer whereby to enhance the slip thereof and to inhibit the accumulation of electrostatic charges thereon without detracting from the transparency, flexibility, strength, moistureproofness, chemical resistance, heat sealability, etc. of the ethylene polymer structures.

Another object is to provide novel compositions for improving the surface characteristics of solid ethylene polymer structures, especially films, sheets and coatings. These and other objects will more clearly appear hereinafter.

The above objects are accomplished according to the present invention by treating the surfaces of a solid ethylene polymer structure with an extremely dilute aqueous composition consisting of water, dispersed polyvinyl acetate, a mixture of amine salts of the formula,

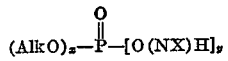

wherein Alk is a primary saturated aliphatic hydrocarbon radical having at least 6 carbon atoms; NX is an oxy-alkylene amine selected from the group consisting of the three ethanolamines, monoethanol - monomethylamine, ethanol - dimethyl amine, diethanol-methylamine, and morpholine; $x$ is an integer not greater than 2; and $y$ is the difference between 3 and $x$; and, optionally, sodium chloride, thereafter removing excess aqueous composition, and drying the treated structures.

The polyvinyl acetate particles deposited upon the film surface provide for good slip and excellent heat seals. It has been found that the type and size of the polymer particle are relatively critical in providing for good slip. For example, it has been found that the polymer particles should be as nearly spherical in shape as possible. Furthermore, the particle must have an approximate particle size of at least 3 microns, but should not exceed 12 microns. Preferably, the amount of polyvinyl acetate in the composition should be in the range of 0.10 to 2%, based on the weight of water. Concentrations below the lower limits are ineffectual for producing best results. On the other hand, concentrations of the dispersed polymer substantially greater than 2% result in the formation of a hazy coating which is highly undesirable in coating substantially transparent solid ethylene polymer film.

The mixed amine salts suitable for purposes of this invention are fully described in copending application of McCarthy, Serial No. 205,235, filed January 9, 1951. These mixed amine salts are those wherein the amine portion is an oxy-alkylene amine, such as mono-, di-, and triethanol amine, the ethanol derivatives of the monoethyl and dimethyl amine, and morpholine. In other words, the group of agents found useful according to this invention are mixtures, composed of compounds defined by the general formula,

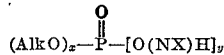

wherein $x$ designates the numeral 1 or 2; while $y$ is the difference between 3 and $x$; Alk is a normal alkyl radical having at least 6 carbon atoms; and NX represents an oxy-alkylene amine selected from the group consisting of the three ethanolamines, the three ethanol-methylamines (i. e., monoethanol - monomethylamine, ethanol - dimethylamine and diethanol-methylamine), and morpholine. The preferred mixture is an equimolecular mixture of monoalkyl-bis (diethanolamine)-phosphate and dialkylmono (diethanolamine)-phosphate, wherein the alkyl radical is a straight-chained, saturated, aliphatic primary hydrocarbon radical of from 8–16 carbon atoms, e. g., the hydrocarbon radical being derived by employing an equimolecular mixture of n-octanol-1, n-decanol-1, and "Lorol" (a commercial mixture of primary alcohols predominantly $C_{12}$ and $C_{14}$) in the preparation of the mixed amine salts. The concentration of these mixed salts in the composition should be within the range of 0.15% to 0.50%, based on the weight of the water.

Sodium chloride functions chiefly as an antiblocking agent; and its presence, although not required, is preferred for this reason. Crystals of the salt precipitate upon the film surface, and these crystals function to separate adjacent film layers and, hence, prevent film-to-film sticking. Sodium chloride crystals should be used in a concentration within the range of 0.15 to 0.50%, based on the weight of the water.

Application of the aqueous dispersion to the surface of the ethylene polymer structure may be accomplished by any convenient expedient such as by dipping, spraying, brushing, roll coating, etc., preferably at a temperature of from 60–70° C. Excess aqueous dispersion may be removed by squeeze rolls, doctor knives, etc. The dispersion should be applied in such amount that there will be deposited from 5 to 25 milligrams of solids per square yard of surface of the ethylene polymer structure.

The following examples will serve to further illustrate the principles and practice of my invention. Parts and percentages are by weight unless otherwise indicated.

*Example I*

Malt-extruded ethylene polymer film, 0.002 of an inch thick, having a haze value of 26 (transparent) was passed through an aqueous dispersion maintained at about 65° C. containing 0.50% particulate polyvinyl acetate having a particle size of from 3–12 microns, 0.15% of an equimolecular mixture of monoalkyl-bis (diethanolamine)-phosphate and dialkyl-mono (diethanolamine)-phosphate, wherein the alkyl radical is a straight-chained, saturated, aliphatic, primary hydrocarbon radical of from 8–16 carbon atoms, and 0.15% sodium chloride, all based on the weight of the water disperse medium. The dilute dispersion was prepared by adding small portions of more concentrated aqueous polyvinyl acetate (55–60% solids) to the proper amount of water. After passing through the aqueous dispersion, the film was passed between rubber squeeze rolls to remove the excess dispersion and dried. The resulting sized film was of high clarity, and the haze value thereof did not differ substantially from that of the unsized film. In addition, the electrostatic propensity of the treated film at 75° F. and 35% R. H. (relative humidity) was 86 volts, as compared with 560 volts for unsized film; and the coefficient of friction (film-to-film) at 75° F. and 75% R. H. was 0.55 (initial) and 0.33 (running), as compared with 2.36+, both initial and running, for unsized film.

The electrostatic propensity characteristic of each film hereinafter set forth for purposes of comparison, was measured as follows:

A strip of film, 1 inch by 4 inches in size, is supported on and in electrical contact with a flat, slightly-roughened stainless steel plate which is connected to a meter for measuring electrical potential, but which is otherwise insulated from its surroundings. The plate is roughened by rubbing it lightly with #100/120 Carborundum cloth, making very slight scratches at right angles to the direction of movement of the film. A weighted, felt-covered block which has a 1 inch by 2 inch face presses the film into contact with the stainless steel plate. An electrostatic charge is generated by pulling the film for a distance of 3 inches between the weighted block and the stainless steel plate, and the charge so generated on the film discharges on to the stainless steel plate with which it is in contact and is measured by the meter. The values registered on the meter (herein called electrostatic propensity) are purely relative and are useful only for purposes of comparison. They indicate the ability of a film to accumulate an electrostatic charge under the influence of friction normally encountered in manipulating or working with the film.

The coefficient of friction of each film was determined as follows:

A rectangular plate of metal linked to an indicator is placed on top of a sheet of polyethylene film supported on a smooth, flat surface. The sheet is then pulled under the metal piece and over the supporting surface at a steady rate. As the metal plate adheres to the moving film, it pulls on the indicator, the extent of the pull being in proportion to the friction between the plate and film. The coefficient of friction is somewhat higher when the film is first pulled under the block (initial) than when it is running steadily (running). The metal block will give a film-to-metal coefficient of friction; and when the block is wrapped in several layers of film and then tested, a film-to-film coefficient of friction is obtained.

*Example II*

Following the procedure of Example I, film of the same specifications was sized with an aqueous dispersion containing 0.50% polyvinyl acetate, 0.35% of an equimolecular mixture of monoalkyl-bis (diethanolamine)-phosphate and dialkyl - mono (diethanolamine) - phosphate, wherein the alkyl radical is a straight-chained, saturated, aliphatic, primary hydrocarbon radical of from 8–16 carbon atoms, and 0.15% sodium chloride. The sized film was of high clarity; had an electrostatic propensity of 62 volts at 75° F. and 35% R. H.; and the coefficient of friction (film-to-film) at 75° F. and 75% R. H. was 0.76

(initial) and 0.50 (running), as compared with 2.36+, both initial and running, for unsized film.

In both of the foregoing examples, the heat-sealing properties of the resultant film were excellent; and at heat-sealing temperatures ranging from 110° C.–130° C., the seal strength was about 1500+ grams (see Ubben, U. S. P. 2,147,180).

It is to be understood that the sizing compositions of the present invention are not only satisfactory for substantially transparent solid ethylene polymer film, but also for translucent films and solid ethylene polymer in other forms. Furthermore, the sizing compositions of the present invention are an improvement over heretofore known sizing compositions insofar as anti-static and slip-promoting properties are concerned.

As many widely differing changes may be made without departing from the spirit and scope of my invention, it is to be further understood that said invention is in nowise restricted save as set forth in the appended claims.

I claim:

1. Structures of ethylene polymer the surfaces of which have uniformly distributed thereon a composition comprising essentially, particulate polyvinyl acetate having a particle size of 3 to 12 microns, and a mixture of compounds of the general formula,

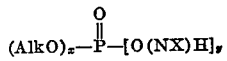

wherein Alk is a primary saturated aliphatic hydrocarbon radical having at least 6 carbon atoms; NX is an oxyalkylene amine selected from the group consisting of monoethanolamine, diethanolamine, triethanolamine, monoethanol-monomethylamine, ethanol-dimethylamine, diethanol-dimethylamine, and morpholine; $x$ is an integer not greater than 2; and $y$ is the difference between 3 and $x$.

2. Structures of ethylene polymer the surfaces of which have uniformly distributed thereon a composition consisting of sodium chloride, particulate polyvinyl acetate having a particle size of 3 to 12 microns, and a mixture of compounds of the general formula,

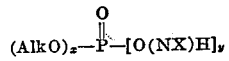

wherein Alk is a primary saturated aliphatic hydrocarbon radical having at least 6 carbon atoms; NX is an oxyalkylene amine selected from the group consisting of monoethanolamine, diethanolamine, triethanolamine, monoethanol-monomethylamine, ethanol-dimethylamine, diethanol-dimethylamine, and morpholine; $x$ is an integer not greater than 2; and $y$ is the difference between 3 and $x$.

3. Films of ethylene polymer the surfaces of which have uniformly distributed thereon a composition consisting of sodium chloride, particulate polyvinyl acetate having a particle size of 3 to 12 microns, and a mixture of compounds of the general formula,

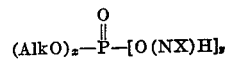

wherein Alk is a primary saturated aliphatic hydrocarbon radical having at least 6 carbon atoms; NX is an oxyalkylene amine selected from the group consisting of monoethanolamine, diethanolamine, triethanolamine, monoethanol-monomethylamine, ethanol-dimethylamine, diethanol-dimethylamine, and morpholine; $x$ is an integer not greater than 2; and $y$ is the difference between 3 and $x$.

4. Transparent films of ethylene polymer the surfaces of which have uniformly distributed thereon a composition consisting of sodium chloride, particulate polyvinyl acetate having a particle size of 3 to 12 microns, and a mixture of compounds of the general formula,

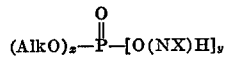

wherein Alk is a primary saturated aliphatic hydrocarbon radical having at least 6 carbon atoms; NX is an oxyalkylene amine selected from the group consisting of monoethanolamine, diethanolamine, triethanolamine, monoethanol-monomethylamine, ethanol-dimethylamine, diethanol-dimethylamine, and morpholine; $x$ is an integer not greater than 2; and $y$ is the difference between 3 and $x$.

5. A method for improving the anti-static and slip characteristics of structures of ethylene polymer which comprises coating the surfaces of said structures with a dilute aqueous dispersion containing from 0.1% to 2% by weight, based on the weight of water, of dispersed particulate polyvinyl acetate having a particle size of from 3–12 microns, and from 0.15% to 0.50% of a mixture of compounds of the general formula,

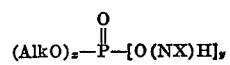

wherein Alk is a primary saturated aliphatic hydrocarbon radical having at least 6 carbon atoms; NX is an oxyalkylene amine selected from the group consisting of monoethanolamine, diethanolamine, triethanolamine, monoethanol-monomethylamine, ethanol-dimethylamine, diethanol-dimethylamine, and morpholine; $x$ is an integer not greater than 2; and $y$ is the difference between 3 and $x$, at a temperature of 60–70° C., and thereafter drying said coated structures.

6. A method for improving the anti-static and slip characteristics of structures of ethylene polymer which comprises coating the surfaces of said structures with a dilute aqueous dispersion containing from 0.15% to 0.50% by weight, based on the weight of water, of sodium chloride, from 0.10% to 2% of dispersed particulate polyvinyl acetate having a particle size of from 3–12 microns, and from 0.15% to 0.50% of a mixture of compounds of the general formula,

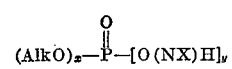

wherein Alk is a primary saturated aliphatic hydrocarbon radical having at least 6 carbon atoms; NX is an oxy-alkylene amine selected from the group consisting of monoethanolamine, diethanolamine, triethanolamine, monoethanol-monomethylamine, ethanol-dimethylamine, diethanol-dimethylamine, and morpholine; $x$ is an integer not greater than 2; and $y$ is the difference between 3 and $x$, at a temperature of 60–70° C., and thereafter drying said coated structures.

7. The method of claim 6 wherein the structure is film.

8. The method of claim 6 wherein the structure is transparent film.

9. A sizing composition for enhancing anti-static characteristics and for promoting slip characteristics of structures of ethylene polymers, comprising essentially water, from 0.10% to 2% by weight, based on the weight of water, of dispersed particulate polyvinyl acetate having a particle size of from 3–12 microns, and from 0.15% to 0.50% of a mixture of compounds of the general formula, $$(AlkO)_x-\overset{O}{\underset{\|}{P}}-[O(NX)H]_y$$

wherein Alk is a primary saturated aliphatic hydrocarbon radical having at least 6 carbon atoms; NX is an oxy-alkylene amine selected from the group consisting of monoethanolamine, diethanolamine, triethanolamine, monoethanol-monomethylamine, ethanol-dimethylamine, diethanol-dimethylamine, and morpholine; $x$ is an integer not greater than 2; and $y$ is the difference between 3 and $x$.

10. A sizing composition for enhancing antistatic characteristics and for promoting slip characteristics of structures of ethylene polymers, comprising essentially water, from 0.15% to 0.50% by weight, based on the weight of water, of sodium chloride, from 0.10% to 2% of dispersed particulate polyvinyl acetate having a particle size of from 3–12 microns, and from 0.15% to 0.50% of a mixture of compounds of the general formula, $$(AlkO)_x-\overset{O}{\underset{\|}{P}}-[O(NX)H]_y$$

wherein Alk is a primary saturated aliphatic hydrocarbon radical having at least 6 carbon atoms; NX is an oxy-alkylene amine selected from the group consisting of monoethanolamine, diethanolamine, triethanolamine, monoethanol-monomethylamine, ethanol-dimethylamine, diethanol-dimethylamine, and morpholine; $x$ is an integer not greater than 2; and $y$ is the difference between 3 and $x$.

THOMAS FRANKLIN BANIGAN.

References Cited in the file of this patent

UNITED STATES PATENTS

| Number | Name | Date |
|---|---|---|
| 2,005,619 | Graves | June 18, 1935 |
| 2,279,501 | Dickey et al. | Apr. 14, 1942 |
| 2,279,502 | Dickey et al. | Apr. 14, 1942 |
| 2,413,428 | Billings | Dec. 31, 1946 |